United States Patent Office 3,400,166
Patented Sept. 3, 1968

3,400,166
SELECTIVE HYDROGENATION OF CYCLODODECATRIENE
Charles G. McAlister, Lake Charles, La., assignor to Columbian Carbon Company, New York, N.Y., a corporation of Delaware
No Drawing. Filed Dec. 21, 1966, Ser. No. 603,462
14 Claims. (Cl. 260—666)

ABSTRACT OF THE DISCLOSURE

Processes are described for minimizing the production of aromatic byproducts during the hydrogenation of cyclododecatrienes by maintaining a reaction temperature of less than 160° C. during the initial stages of the reaction and then continuing the reaction at an increased temperature of up to about 300° C. Illustrations show such hydrogenation reactions conducted under both constant hydrogen pressure and gradually decreasing pressures in which the initial low temperature is maintained until from about 0.75 mole to about 1.85 moles of hydrogen per mole of cyclododecatriene have reacted.

---

This invention relates to the selective hydrogenation of cycloaliphatic compounds having a twelve member carbocyclic ring containing three ethylenic double bonds. More specifically, it relates to a procedure for minimizing the formation of undesirable by-products by the collapse of the carbocyclic ring during hydrogenation of a cyclododecatriene. In a specific embodiment, this invention relates to carefully controlled temperature staging during the hydrogenation of cyclododecatriene-1,5,9 to cyclododecene or cyclododecane so as to minimize the production of aromatic by-products.

Procedures for the selective hydrogenation of unsaturated aliphatic compounds, including large ring cycloaliphatics such as cyclododecatriene, are well known. Such prior art procedures are generally conducted in a stirred pressure reactor at a fixed elevated pressure and temperature until a stoichiometric quantity of hydrogen has been absorbed by the unsaturated aliphatic feed. Both molecular hydrogen, in conjunction with a wide variety of metal or metal salt hydrogenation catalysts, and nascent hydrogen are commonly utilized. In many cases, the nature of the feed stock and the intermediates formed during the course of these reactions are such that high selectivities to the desired products can be attained under a broad range of reaction conditions.

The cyclododecatrienes are, however, unique in that under conventional hydrogenation conditions, extensive isomerization or degradation of the starting material, intermediates and desired product may occur. Gas chromatographic analyses made during various stages of the hydrogenation of cyclododecatriene have indicated that as many as forty-eight different compounds or isomers may be present. This peculiar susceptibility of twelve member carbocyclic ring structures to isomerization or degradation leads to the production of hydrogenated products which are highly contaminated and which are often difficult to purify by simple distillation procedures. The concentration of certain of these by-products, such as cyclododecadiene, can be reduced by reacting more than a stoichiometric quantity of hydrogen. This technique, however, has only limited applicability, as attempts at controlled overhydrogenation are almost invariably accompanied by further undesirable side reactions. For example, in the production of cyclododecene, the use of a calculated excess of hydrogen under conventional reaction conditions will reduce the cyclododecadiene concentration but will also generally result in significant increases in the yields of both cyclododecane and aromatics.

The formation of aromatics, exemplary of which are benzocyclooctene and benzocyclooctane, has been particularly troublesome in the selective hydrogenation of cyclododecatriene. The presence of these materials as contaminants in the cyclododecene or cyclododecane product of such reaction is, of course, undesirable if this product is to be converted to the corresponding alpha-omega dibasic acid or lactam. Purification procedures are, therefore, generally necessary in order to reduce the concentration of these materials to tolerable limits of below about 1–2% by weight. In addition to the purification problems directly attributable to the presence of aromatics in the cyclododecene or cyclododecane product, further difficulties may be encountered because of other side reactions which appear to be precipitated by their formation. The precise mechanism has not been definitely ascertained; however, it is belived that much of the isomerization, fragmentation and overhydrogenation occurring during the reduction of cyclododecatriene is the result of hydrogen transfer from a transitory aromatics precursor which is primarily the product of the collapse of the cyclododecadiene ring. The unpredictable availability of hydrogen from this source, coupled with the usual difficulties encountered in closely controlling the reaction of a calculated quantity of added hydrogen, often completely obscures the reaction end point.

The potential magnitude of the problems associated with aromatics formation is most readily apparent in the reduction of cyclododecatriene to cyclododecene in a conventional hydrogenation system in which the cyclododecatriene and hydrogen are present in a molar ratio of 1:2. Since the principal source of aromatics, cyclododecadiene, is the product of equimolar quantities of these reactants, the formation of one mole of armatics by collapse of the cyclododecadiene ring provides one mole of hydrogen in excess of that necessary to convert the remaining compounds having a twelve member carbocyclic ring structure to monoolefin. Furthermore, the formation of one mole of benzocyclooctene from cyclododecane liberates three additional moles of hydrogen. The total quantity of excess hydrogen is sufficient to convert four moles of the desired monoolefin to cyclododecane. Thus, each mole of benzocyclooctene that is formed may introduce as much as five moles of contaminants into the cyclododecene product.

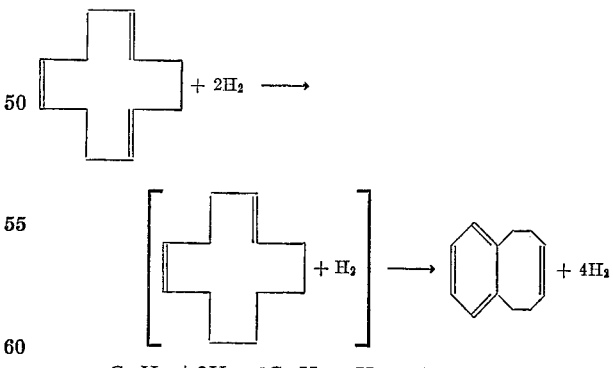

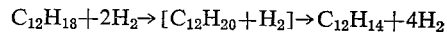

Attempts in the past to develop a commercially practicable isothermal process for the selective hydrogenation of cyclododecatriene without the formation of large quantities of aromatics and other contaminants have been singularly unsuccessful. These efforts have been hampered to some extent by the fact that many of these contaminants were difficult to identify and were often erroneously reported as desired product. A further complication was introduced by the erratic and often paradoxical results obtained by varying reaction temperatures and pressures. For example, the use of a high hydrogen partial pressure in a low temperature reaction designed to produce cyclododecene results in considerably less aromatics formation than a similar high temperature reaction. Neither is entirely satisfactory for commercial application because of the high degree of product contamination with cyclododecane. Although the aromatics content of such low temperature/high pressure cyclododecene may be at a level which is acceptable for certain purposes, the further hydrogenation of this crude monoolefin to cyclododecane under identical conditions results in a significant increase in the concentration of the aromatic by-product. Typical of such fixed temperature and pressure reactions are Examples 1 and 3 through 6, below.

A principal object of this invention is to provide an improved process for selectively hydrogenating cycloaliphatic compounds having a twelve member carbocyclic ring containing three ethylenic double bonds which is relatively free of the aforementioned disadvantages of the similar prior art processes. A particular object of this invention is to provide a process for minimizing the formation of aromatic products durng the hydrogenation of cyclododecatriene to cyclodecene or cyclododecane. These objects and other features of advantage, which will be apparent from the consideration of the following detailed process description, can be achieved by operation in accordance with this invention.

It has now been discovered that the formation on aromatic products by collapse of the $C_{12}$ carbocyclic ring can be minimized during the hydrogenation of a cyclododecatriene with gaseous hydrogen by maintaining a reaction temperature below about 160° C. until a quantity of hydrogen has been reacted which is equivalent to form about 25% to about 60% of that theoretically necessary to saturate the triene, and then continuing the reaction until the desired level of hydrogenation has been achieved at an increased reaction temperature of up to about 300° C.

Although not wishing to be bound by any theory as to the reason for the effectiveness of the procedures of this invention, it is postulated that the partially hydrogenated intermediate cyclododecadiene is the precursor of the bulk of the aromatics which are usually present as contaminants in cyclododecene or cyclododecane. It is further theorized that at high cyclododecatriene concentrations, as in the early phases of the hydrogenation reaction, the rate of formation of cyclododecadiene far exceeds its rate of conversion to monoolefin and other products. During such period of increasing or high cyclododecadiene concentration, temperature appears to be the principal rate controlling factor in the formation of aromatics, with a rather sharp increase in this rate being evident at temperature in excess of about 160° C. It is therefore essential that this early phase of the hydrogenation reaction be conducted at temperatures of from about 60° C. to about 160° C., and preferably from about 130° C. to about 155° C. On the other hand, during periods of decreasing cyclododecadiene concentration and lower cyclododecatriene concentrations, as in the later phases of the reaction, increases in reaction temperature to above 160° C. do not significantly increase the rate of ring collapse. Since aromatics formation at this stage of a hydrogenation reaction appears to be primarily a function of time at any elevated temperature, the use of such higher temperatures serves the dual purpose of minmizing further aromatics formation and of enabling one to complete the hydrogenation reaction in a reasonable period of time.

It has been found that in the course of hydrogenating cyclododecatriene, the cyclododecadiene concentration reaches a maximum value at a surprisingly early stage of the hydrogenation reaction. In general, this peak occurs at a point somewhat before that at which the molar ratio of reacted triene to reacted hydrogen is 1:1. Since the peak concentration of cyclododecadiene is usually not sharp, it is desirable to maintain the temperature below 160° C. until from about 0.75 mole to about 1.85 moles of hydrogen and preferably until from about 1.35 moles to about 1.65 moles of hydrogen have reacted per mole of triene feed. At this point, the formation of aromatics becomes primarily a function of time and reaction temperatures may be raised to a level, suitably from about 165° C. to about 230° C., at which the desired degree of hydrogenation will be rapidly attained. A temperature of from about 170° C. to about 190° C. has been found to be particularly favorable.

The increase in reaction temperature during the conduct of the process of the present invention may be by one or more discreet increments of up to about 30° C. each, as in Examples 9 and 11, or the temperature may be smoothly increased as in Example 10.

The process of this invention is suitably conducted under any positive hydrogen partial pressure up to about 100 p.s.i.a. or higher. It is generally preferred to conduct that portion of the reaction during which the temperature is maintained below 160° C. under a hydrogen partial pressure from about 20 p.s.i.a. to about 40 p.s.i.a. When cyclododecane is the desired product, the subsequent stages of the reaction may also be conducted under the same or higher hydrogen partial pressures. On the other hand, when the desired product is cyclododecene, it is generally advantageous to reduce this pressure as increased temperatures are utilized to a preferred value of from 15 p.s.i.a. to about 18 p.s.i.a. When pressure staging is utilized, it may, like temperature, be effected either in discreet steps or smoothly.

The hydrogenation reaction of this invention may be conducted utilizing any hydrogen source which does not contain excessive quantities of reactive impurities. Thus, reformer streams containing from 70% to 95% by weight of hydrogen or synthesis gas containing substantial quantities of carbon dioxide can be employed. Nascent hydrogen may be used in the absence of a hydrogenation catalyst; however, economic considerations will generally dictate the use of a source of molecular hydrogen in the presence of a conventional hydrogenation catalyst.

Exemplary of such catalysts, which may be used with or without a support, are those containing a Group VIII metal and particularly a noble metal. The catalyst selected and the concentration employed will, of course, affect both the product distribution and reaction time. The effect of temperature staging as described herein can, however, be realized to varying degrees with any conventional hydrogenation catalyst. Particularly favorable results and short reaction times can be obtained by the use of from about 0.1% to about 10% preferably 0.2% to 2%, by weight (based on cyclododecatriene feed) of a palladium on carbon catalyst that produced by depositing from about 1% to about 10% by weight of finely divided metallic palladium on a vegetable charcoal substrate. Since such material may be pyrophoric, it is advantageously employed in a water wet condition.

Although it is not essential that solvents be used in the practice of the instant invention, the presence of inert liquids, such as hexane, heptane, benzene, or toluene, may be helpful in controlling the temperature during the course of the reaction.

It is important that the reaction mixture be well agitated during that portion of the reaction which is conducted below 160° C. to prevent localized overheating. Suitable mixing can be effected by any conventional means, such as by the use of a propeller or turbine agitator. During the higher temperature portions of the reaction, only sufficient agitation is necessary to insure efficient contact between the liquid reaction mixture and the hydrogen. Such contact can suitably be achieved by means of a propeller or turbine agitator or by bubbling the hydrogen through the liquid reaction mixture.

Cyclododecatriene suitable for use in the present invention includes cyclododecatriene-1,5,9, including the cis trans trans isomer, the trans trans isomer, the cis cis trans isomer, the cis cis cis isomer and mixtures thereof, as well as cyclododecatrienes containing conjugated unsaturation and lower alkyl or halogen substituted analogs of these hydrocarbons. It is not essential that these materials be used in a highly purified form; however it should be understood that the maximum benefits of this invention will be realized when reactive impurities and known catalyst poisons are essentially absent.

The hydrogenation reactions of this invention may suitably be conducted in any pressure reactor in which the reaction temperature and pressure can be controlled within the limits discussed above. Such reactor is also advantageously provided with conventional means for monitoring hydrogen consumption; calculations based on gas flow meter readings or hydrogen reservoir depletion being generally satisfactory. If more precise control of temperature and pressure staging points is desired, a somewhat greater degree of accuracy in measuring reacted hydrogen can, of course, by achieved by sampling and analyzing the reactor liquids. When repeated hydrogenations of a standard composition feedstock are conducted under substantially identical conditions, as in a commercial operation, particularly accurate and rapid results can be obtained using a calibrated refractometer.

The numerous advantages inherent in operations conducted in accordance with the instant invention will be evident from an examination of the following comparative examples.

In each of Examples 1 through 10, a clean dry 500 milliliter autoclave, equipped with a magnetic stirrer, is charged with 2 grams of 5% palladium on carbon catalyst and 162 grams of 99+% pure cyclododecatriene-1,5,9. Stirring is then commenced and the autoclave swept with high purity hydrogen for two minutes. Heat and additional high purity hydrogen are then introduced as set forth in the individual examples. The reactions are terminated by venting the autoclave and rapidly cooling the contents. Following recovery of the catalyst by filtration, the liquid reaction products are analyzed by gas chromatography.

Example 1 is illustrative of a prior art procedure for the production of cyclododecane utilizing moderate hydrogen pressures and high temperatures throughout the reaction period. Example 2 demonstrates the effect in a similar reaction of a low initial temperature, coupled with temperature staging, in accordance with this invention.

EXAMPLE 1

The autoclave is pressured to 20 p.s.i.g. with hydrogen and then heated to 210° C. These conditions are maintained until 6 grams (3 moles) of hydrogen have been reacted. Analysis of the reaction product shows that it contains over 11% by weight of aromatics, the remainder being primarily cyclododecane.

EXAMPLE 2

The autoclave is pressured to 20 p.s.i.g. with hydrogen and heated to 148° C. These conditions are maintained until 1.6 moles of hydrogen have been reacted. An additional mole of hydrogen is then reacted at 170° C. and 20 p.s.i.g. A final 0.4 mole of hydrogen is reacted at 190° C. and 40 p.s.i.g. The crude cyclododecane reaction product contains less than 1% by weight of aromatic impurities.

Examples 3 through 6 are illustrative of a number of problems which are involved in the reduction of cyclododecatriene to cyclododecene utilizing isothermal conditions. It is evident that under such conditions high hydrogen pressures depress aromatics formation, but that this desirable effect is accompanied by the production of large quantities of overhydrogenated material. Example 7 shows that substantial and unexpected improvements over isothermal hydrogenation techniques (as illustrated by Example 7b) can be realized by reducing the hydrogen pressure during the course of the reaciton in accordance with the procedure defined in copending application S.N. 562,780 (Example 7a), and that further improvements result from the employment of the procedural steps of this invention (Example 7c). Examples 8 through 11 also illustrate temperature control reactions conducted in accordance with this invention.

EXAMPLE 3

The autoclave is pressured to 35 p.s.i.a. with hydrogen and heated to 210° C. These conditions are maintained until 4 grams of hydrogen (2 moles) have been reacted. The reaction product contains aromatics and cyclododecane in excess of 6% by weight and 10% by weight, respectively.

EXAMPLE 5

Four grams (2 moles) of hydrogen are reacted at a temperature of 140° C. under a hydrogen pressure of 115 p.s.i.a. The reaction product contains less than 1% aromatics and greater than 10% cyclododecane.

EXAMPLE 6

The autoclave is maintained at 140° C. under a hydrogen pressure of 20 p.s.i.a. for five hours, at which time, the cyclododecatriene and cyclododecadiene concentrations in the reaction mixture are both in excess of 10% by weight. After four additional hours under these temperature and pressure conditions, the aromatics content of the reaction mixture reaches 3 wt. percent with less than two moles of hydrogen having reacted.

EXAMPLE 7a

The autoclave is heated to 160° C. under a hydrogen pressure of 55 p.s.i.a. These conditions are maintained until 1.2 moles of hydrogen have been reacted. The pressure is then decreased slowly, while maintaining a temperature of 160° C. to a final value of 20 p.s.i.a. during the reaction of an additional 0.8 mole of hydrogen. The crude cyclododecene reaction product contains 2.9 wt. percent aromatics and 4.7 wt. percent cyclododecane.

EXAMPLE 7b

The autoclave is heated to 160° C. under a hydrogen pressure of 55 p.s.i.a. These conditions are maintained until 2 moles of hydrogen have reacted. The crude cyclododecene reaction product contains more than 3 wt. percent aromatics and 7 wt. percent cyclododecane.

EXAMPLE 7c

The autoclave is heated to 140° C. under a hydrogen pressure of 55 p.s.i.a. These conditions are maintained until 1.3 moles of hydrogen have reacted. The temperature is then raised to 180° C. and held at this level under a hydrogen pressure at 55 p.s.i.a. until a total of two moles of hydrogen have reacted. The crude reaction product contains less than 1 wt. percent aromatics and 4.5% cyclododecane.

EXAMPLE 8

The autoclave is heated to 138° C. and the hydrogen pressure adjusted to 30 p.s.i.a. These conditions are maintained unti 1.2 moles of hydrogen have reacted. The temperature is then held at 148° C. and the hydrogen pressure at 20 p.s.i.a. during the reaction of an additional 0.6 mole of hydrogen. A final 0.2 mole portion of hydrogen is reacted under a pressure of 16 p.s.i.a. at 168° C. The reaction is complete in five hours yielding a product containing 94.6 wt. percent cyclododecene, less than 0.3 wt. percent aromatics and less than 1.5 wt. percent each of cyclododecane and cyclododecadiene.

EXAMPLE 9

The procedure of the preceding example is repeated, the only change being the operation at 148° C. during the initial temperature stage, 168° C. in the second stage and 180° C. in the final stage. Reaction is complete in two hours and ten minutes and the reaction product is substantially identical to that of the preceding example.

EXAMPLE 10

The autoclave contents are heated to 148° C. under a hydrogen pressure of 28 p.s.i.a. The temperature is increased smoothly to 160° C. and the pressure smoothly reduced to 23 p.s.i.a. during the reaction of 1.1 moles of hydrogen. The smooth increase in temperature and decrease in pressure is continued during the reaction of an additional 0.9 mole of hydrogen. At the end of this reaction period, the hydrogen pressure is 15.5 p.s.i.a. and the temperature 175° C. The reaction, which is completed in two hours and 25 minutes, yields a crude cyclododecene product containing 95.1 wt. percent cyclodecene and less than 0.3 wt. perecent aromatics.

The following Example 11 demonstrates the use of a refractometer to monitor temperature staging during the hydrogenation of a commercial batch of cyclodecatriene with reformer hydrogen. The selection of the refractive indices which are used as a guide for temperature staging was made by correlating refractive index measurements with gas chromatographic analyses of samples of this commercial cyclododecatriene which had been hydrogenated to varying degrees under conditions similar to those employed here. In this example, a refractive index of $n_D^{40}=1.4825$, indicates, with a wide margin of safety, that between 0.75 mole and 1.85 moles of hydrogen have been reacted per mole of cycoldodecatriene.

EXAMPLE 11

A clean dry 100 gallon reaction vessel equipped with a turbine agitator is charged with 6.5 pounds of 5% palladium on carbon catalyst and 99 gallons of commercial cyclododecatriene containing 98–99 weight percent cyclodecatriene-1,5,9. Stirring is commenced and the reactor swept with reformer hydrogen (90–91 wt. percent $H_2$) for two minutes. The reactor is then rapidly heated to 148° C. and the hydrogen partial pressure adjusted to 17 p.s.i.g. Additional reformer hydrogen is introduced on demand so as to maintain a hydrogen partial pressure of 15 to 20 p.s.i.g. at a temperature of 148° C. to 152° C. for one hour, at which point the refractive index of the liquid reactor contents is $n_D^{40}=1.4825$. The reactor temperature is then maintained at 158° C. to 162° C. and the hydrogen partial pressure at 4 p.s.i.g. to 7 p.s.i.g. for an additional hour, at which point the refractive index is $n_D^{40}=1.4790$. The temperature is then held at 170° C. to 174° C. at a hydrogen partial pressure of 0.5 p.s.i.g. to 2 p.s.i.g. for 15 minutes to reduce the refractive index of the liquid reactor contents $$n_D^{40}=1.4775$$

The reaction end point, as measured by a refractive index of $n_D^{40}=1.4766$ is reached after an additional 15 minutes under a hydrogen partial pressure of 0.5 p.s.i.g. to 1 p.s.i.g. at 180° C. to 184° C. The reactor is then vented and cooled, and the catalyst recovered by filtration. Gas chromatographic analyses of the crude reaction product shows 93.1 wt. percent cyclododecene, with less than 1.5 wt. percent each of cyclododecane and cylododecadiene and less than 0.5 wt. percent total aromatics.

I claim:
1. In a process for hydrogenating a cyclododecatriene with gaseous hydrogen, the improvement which minimizes the formation of aromatic products consisting essentially of a first step of maintaining a reaction temperature below about 160° C. until a quantity of hydrogen has been reacted which is equivalent to from about 25% to about 60% of that theoretically necessary to saturate said cyclododecatriene and a second step of reacting additional hydrogen at an increased reaction temperature of up to about 300° C. until a total of at least about 2 moles of hydrogen per mole of cyclododecatriene have reacted.

2. The process of claim 1 wherein the reaction temperature in said first step is maintained at from about 60° C. to about 160° C.

3. The process of claim 1 wherein the reaction temperature in said first step is maintained at from about 130° C. to about 155° C.

4. The process of claim 1 wherein the reaction temperature is increased to from about 165° C. to about 230° C. during second step.

5. The process of claim 4 wherein the reaction temperature in said second step is increased by at least one increment of up to about 30° C. to from about 165° C. to about 230° C.

6. The process of claim 1 wherein said increased reaction temperature is maintained until a total of about two moles of hydrogen per mole of said cyclododecatriene have reacted.

7. The process of claim 1 wherein said increased reaction temperature is maintained until a total of about three moles of hydrogen per mole of said cyclododecatriene have reacted.

8. In a process for the production of cyclododecene by the reaction of hydrogen with cyclododecatriene-1,5,9 in contact with a hydrogenation catalyst, the improvement which minimizes the formation of aromatic products consisting essentially of conducting said reaction at a temperature of from about 130° C. to about 155° C. until from about 0.75 mole to about 1.85 moles of hydrogen per mole of said cyclododecatriene have reacted; and then raising said reaction temperature to from about 165° C. to about 230° C. while continuing said reaction until a total of about 2 moles of hydrogen per mole of said cyclododecatriene have reacted.

9. The process of claim 8 wherein said reaction is conducted at a temperature of from about 145° C. to about 155° C. until from about 1.35 moles to about 1.65 moles of hydrogen per mole of said cyclododecatriene have reacted and said temperature is then raised by at least one increment of up to about 30° C. to a temperature of from about 170° C. to about 190° C. at the completion of said reaction.

10. The process of claim 1 wherein the reactants are contacted with a hydrogenation catalyst.

11. The process of claim 10 wherein said hydrogenation catalyst is a Group VIII metal.

12. The process of claim 11 wherein said Group VIII metal is palladium.

13. The process of claim 1 wherein the reactants are contacted with from about 0.1% to about 10% by weight based on said cyclododecatriene of a supported catalyst comprising palladium on carbon and containing from about 1% to about 10% by weight of palladium.

14. The process of claim 13 wherein the reactants are contacted with from about 0.2% to about 2% of palladium on charcoal catalyst containing about 5% palladium.

References Cited

UNITED STATES PATENTS

| | | | |
|---|---|---|---|
| 3,022,359 | 2/1962 | Wiese et al. | 260—666 |
| 3,310,590 | 3/1967 | Suld | 260—666 |
| 3,316,319 | 4/1967 | Armstrong | 260—666 |
| 3,336,404 | 8/1967 | Chappell | 260—666 |

DELBERT E. GANTZ, *Primary Examiner.*

V. O'KEEFE, *Assistant Examiner.*